(12) United States Patent
Laity et al.

(10) Patent No.: US 6,780,047 B1
(45) Date of Patent: Aug. 24, 2004

(54) NETWORK COMMUNICATIONS SYSTEM

(75) Inventors: Ian Laity, Simi Valley, CA (US);
James R. Bauder, Palmdale, CA (US);
Franklin E. McLinn, Simi Valley, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/534,888

(22) Filed: Mar. 24, 2000

(51) Int. Cl.[7] .............................................. H01R 13/72
(52) U.S. Cl. ..................... 439/501; 439/535; 439/652
(58) Field of Search ............................... 439/501, 535, 439/652, 4

(56) References Cited

U.S. PATENT DOCUMENTS

| | | | |
|---|---|---|---|
| 4,646,987 A | 3/1987 | Peterson | 242/107.11 |
| 4,713,497 A | 12/1987 | Smith | 191/12.2 R |
| 4,733,389 A | 3/1988 | Puvogel | |
| 5,351,241 A | 9/1994 | Yehonatan | 370/85.3 |
| 5,392,285 A | 2/1995 | Kurts | 370/85.2 |
| 5,414,708 A | 5/1995 | Webber et al. | 370/85.3 |
| 5,596,479 A * | 1/1997 | Campbell et al. | 361/643 |
| 5,657,841 A | 8/1997 | Morvan | 191/12.4 |
| 5,669,571 A | 9/1997 | Graybill | 242/378.1 |
| 5,671,833 A | 9/1997 | Edwards et al. | 191/12.2 R |
| 5,690,198 A * | 11/1997 | Lohr | 191/12.2 R |
| 5,700,158 A * | 12/1997 | Neiser et al. | 439/501 |
| 5,701,981 A * | 12/1997 | Marshall et al. | 191/12.4 |
| 5,718,310 A | 2/1998 | Gallo | 191/12.2 R |
| 5,797,558 A | 8/1998 | Peterson et al. | 242/373 |
| 5,831,211 A | 11/1998 | Gartung et al. | 174/48 |
| 5,841,628 A | 11/1998 | Alpert et al. | 361/600 |
| 5,946,389 A | 8/1999 | Dold | 379/325 |
| 6,056,591 A * | 5/2000 | Liao | 439/501 |
| 6,077,108 A | 6/2000 | Lorscheider et al. | 439/501 |

FOREIGN PATENT DOCUMENTS

| | | | |
|---|---|---|---|
| EP | 0 928 053 A2 | 7/1999 | ........... H02G/11/02 |
| EP | 0 981 227 A2 | 8/1999 | |
| WO | WO 98/12846 | 9/1997 | |
| WO | WO 00/67353 | 11/2000 | ........... H02G/11/02 |

OTHER PUBLICATIONS

PCT International Search Report dated Feb. 15, 2001 re International application No. PCT/US 00/20105, international filing date Jul. 24, 2000.

* cited by examiner

*Primary Examiner*—Tho D. Ta
(74) *Attorney, Agent, or Firm*—Blakely, Sokoloff, Taylor & Zafman LLP

(57) ABSTRACT

A network communications system is provided for allowing a group of computer users in a conference room or similar small work environment to access an Ethernet local area network (LAN) and to provide peer-to-peer group networking without connection to a backbone network.

The system includes multiple (for example, 4 or 8) client computer ports each including a removable spring loaded cable dispenser carrying an extendible/retractable Category 5 LAN cable terminated with an RJ-45 plug for connection to a client computer's network adapter. Combined power/ Ethernet LAN cables connect the system to an enterprise network and to a source of electrical power, and permit cascading of up to three 8-port systems.

In use, a computer user pulls out the cable from one of the client ports and inserts the RJ-45 plug into the RJ-45 jack on the network adapter carried by the computer. After completion of the networking session, the user unplugs the cable which is automatically retracted by the spring loaded cable reel. A cable management system is thereby provided which eliminates the tangle or clutter of multiple cables encountered in existing systems.

27 Claims, 17 Drawing Sheets

RJ-45 PIN ASSIGNMENTS

| SIGNAL NAME | P1 PIN NO. | WIRE COLOR | P2 PIN NO. | SIGNAL NAME |
|---|---|---|---|---|
| 24 V | 10 | ORANGE/WHITE | 10 | 24 V |
| 24 V | 9 | ORANGE | 9 | 24 V |
| GND | 8 | BLUE/WHITE | 8 | GND |
| GND | 7 | BLUE | 7 | GND |
| N/C | 6 | N/C | 6 | N/C |
| N/C | 5 | N/C | 5 | N/C |
| RxN | 4 | BROWN/WHITE | 2 | TxN |
| RxP | 3 | BROWN | 1 | TxP |
| TxN | 2 | GREEN/WHITE | 4 | RxN |
| TxP | 1 | GREEN | 3 | RxP |

FIG.16

NETWORK COMMUNICATIONS SYSTEM

FIELD OF THE INVENTION

The present invention relates generally to data communications networking and particularly to a network communications system allowing a group of computer users in a conference room or similar small work area to access a local area network (LAN) and to provide peer-to-peer group networking and resource sharing without accessing the LAN.

BACKGROUND OF THE INVENTION

The widespread use of notebook and handheld computer systems in business environments has created a need for informal network access and information sharing. Mobile users require constant access to the company network for E-mail, internet and intranet services. Small workgroups of mobile notebook and handheld computer users often assemble for a meeting or a joint task, access and exchange computerized information in an ad hoc manner and then disband. There is a need to facilitate this rapid workgroup "setup and tear down" in a conference room or similar small work area allowing two or more computer users to access a network at the same time, and also to share files, peripherals, and other resources without connection to a backbone network.

The availability of networking connections in conference rooms has heretofore been limited because of the high cost of custom conference room furniture with integrated LAN jacks. Thus, conference rooms are often equipped with only one LAN wall jack thereby limiting network access to only one user at a time. In addition, existing LAN hubs and switches are not designed to be seamlessly integrated into a conference room or similar environment. Thus, placing such a LAN interconnection apparatus in a conference room requires many individual network cables to connect users' computers to the apparatus. Conference rooms so equipped are often plagued with a tangle of unsightly cables and sometimes cables are removed from the room. Moreover, mobile computer users moving about company premises to attend team meetings, view presentations or work on group projects, must often carry their own network cables and search for open network jacks in a conference room or other work area.

SUMMARY OF THE INVENTION

Broadly, the present invention provides a network communications system for efficiently connecting a plurality of computer systems with a local area network in a small work area environment such as a conference room. The system includes a plurality of retractable cables connectable to a corresponding number of computers that eliminate the inevitable tangle of network cables that occur with existing hub and switch products. Further, the system facilitates the inexpensive addition of network connectivity to a conference room environment.

In accordance with one specific embodiment of the invention, there is provided a network communications system for networking a plurality of computers, the system including a plurality of client computer ports, multiport circuitry such as a LAN switch for interconnecting the plurality of client computer ports in the network, and a removable, replaceable, network communications cable dispensing device, preferably in the form of a spring loaded reel take-up device, associated with each client port. The communications cable carried by each cable dispensing device has a first portion and a second portion. The first portion of the communications cable is fixed relative to the cable dispensing device and has an extremity carrying a first connector adapted to be coupled to one of the ports of the multiport interconnecting circuitry. The second portion of the communications cable is extendible from and retractable, under spring load, into the cable dispensing device and has an extremity carrying a second connector adapted to be coupled to one of the computers. In accordance with a preferred embodiment, the communications cable comprises flat, Category 5 compliant LAN cable including two twisted wire pairs, and the connector at the extremity of each of the first and second portions of the communications cable comprises an RJ-45 modular plug.

Further in accordance with a preferred embodiment, the system includes a combined power/Ethernet LAN cable for connecting the system both to a network and to a source of electrical power. In addition, the system may include a combined power/Ethernet LAN cable for coupling the system to a second network communications system of the invention in cascaded or daisy chain fashion.

In accordance with another aspect of the present invention, the combined power/Ethernet LAN cable comprises a first group of conductors comprising two twisted wire pairs for transmitting Ethernet LAN signals. The first group of conductors has a first end and a second end, the first end being adapted to be connected to the Ethernet LAN. The combined cable further includes a second group of conductors comprising, like the first group of conductors, two twisted wire pairs for transmitting electrical power to the system. The second group of conductors has a first end and a second end, the first end of the second group of conductors being adapted to be connected to a source of electrical power. An RJ-45 modular connector having at least eight contact positions terminates the second ends of the first and second groups of conductors. The conductors of the first group of conductors are connected to the contacts of a first group of four of the contact positions of the RJ-45 connector and the conductors of the second group of conductors are connected to the contacts of a second group of four of the contact positions of the RJ-45 connector. EMI/RFI shielding encloses the first group of conductors and an insulative jacket encloses both the first and second groups of conductors. In accordance with a specific embodiment of this aspect of the invention, the RJ-45 connector has ten contact positions, Nos. 1–10, the conductors of the first group of conductors being connected to the contacts of contact positions 1–4 and the conductors of the second group of conductors being connected to contact positions 7–10. The middle contact positions 5 and 6 of the RJ-45 connector are devoid of contacts to provide electrical isolation between the first and second groups of conductors.

In accordance with yet another aspect of the present invention, there is provided a power/Ethernet LAN adapter assembly comprising an enclosure having attached thereto a combined power/Ethernet LAN cable as described above; an electrical power cord; and a Category 5 compliant cable terminated with an RJ-45 modular plug for connection to a LAN. The enclosure contains pass-through conductors interconnecting the Category 5 compliant cable with the first end of the first group of conductors of the combined power/Ethernet cable, and a power supply interconnecting the power cord and the first end of the second group of conductors of the combined cable.

BRIEF DESCRIPTION OF THE DRAWINGS

Further objects, features and advantages of the invention will become evident from the detailed description, below, when read in conjunction with the accompanying drawings in which:

FIG. 16 is a chart showing the contact assignments of the combined power/LAN cables of FIGS. 13 and 14.

DETAILED DESCRIPTION OF THE PREFERRED EMBODIMENTS

By way of example, the invention will be described with reference to the widely used 10/100 Mbps Ethernet local area networks (LANs) typically found in workplace environments. Such Ethernet LANs conform to the IEEE 802.3, 802.3u and 802.3x network standards which are incorporated herein by reference.

Figure 1:
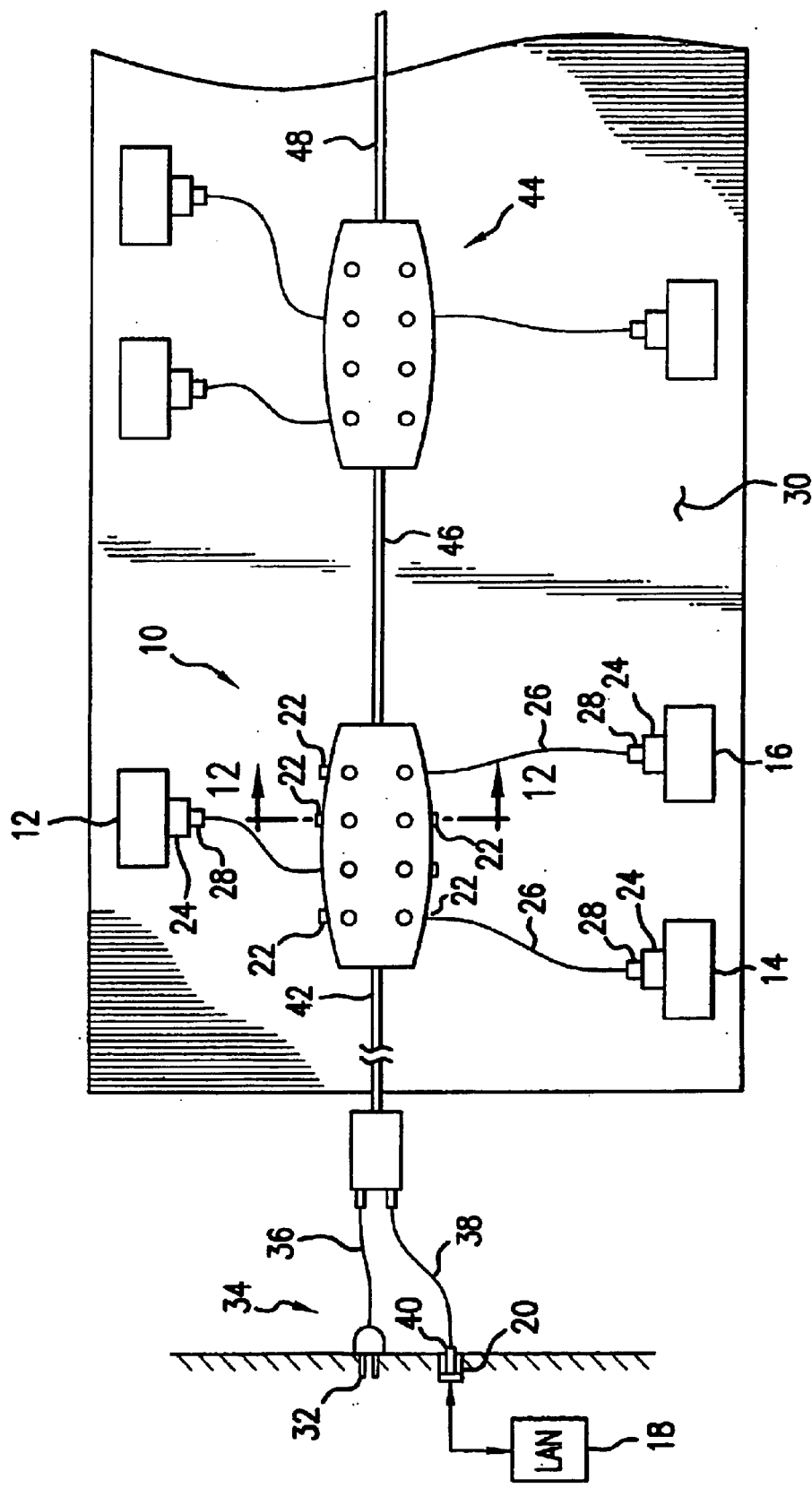
FIG. 1 is a schematic representation of a pair of 8-port network communications systems in accordance with a first embodiment of the invention, with the systems shown placed on a conference room table.
Figure 2:
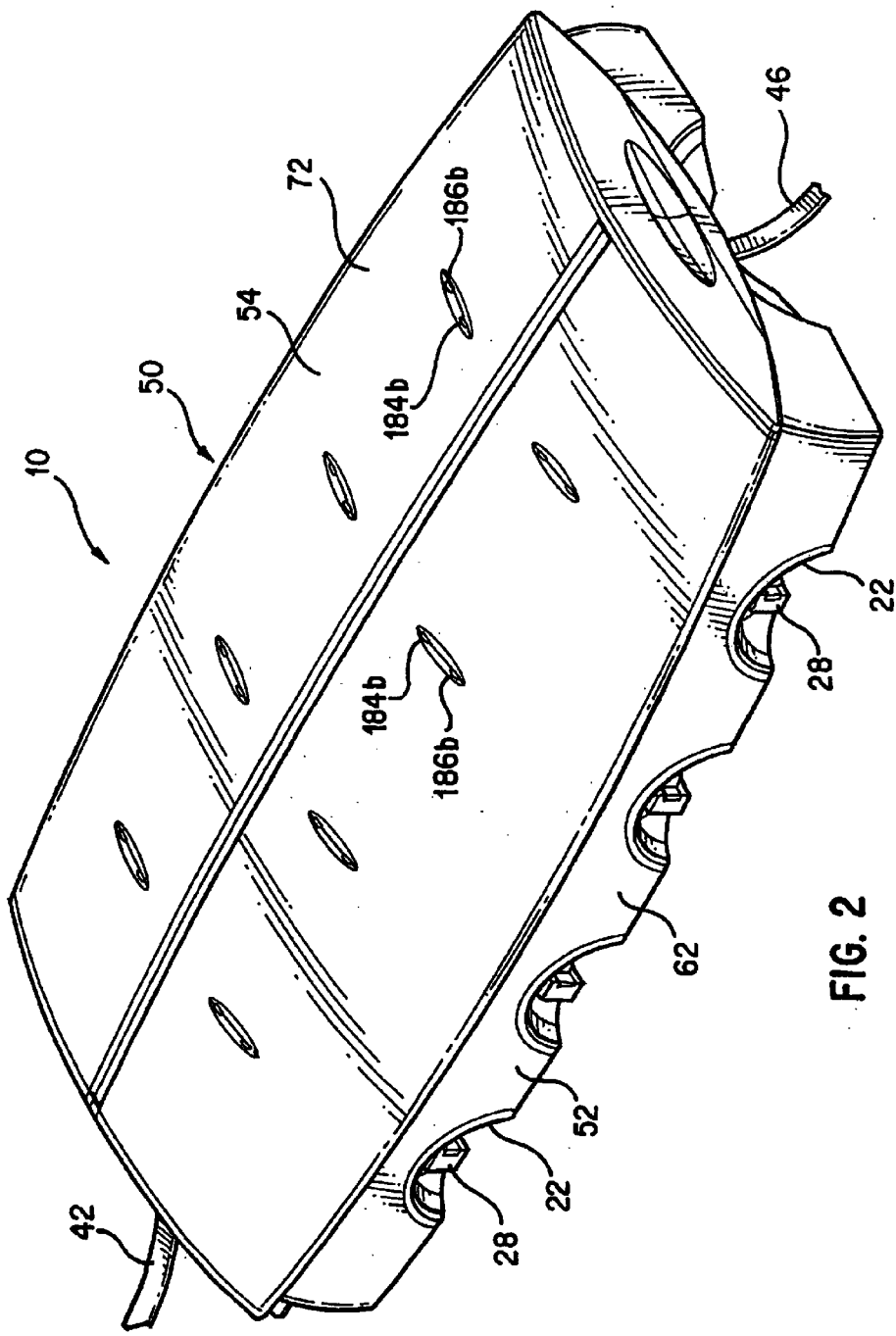
FIG. 2 is a top perspective view of one of the systems shown in FIG. 1.

Referring first to the schematic representation of FIG. 1, there is shown a network communications system 10 for connecting, for example, a plurality of portable computers 12, 14 and 16 to each other and to an Ethernet local area network 18 via an RJ-45 wall jack 20. The specific embodiment of the system 10 shown in FIG. 1 has eight (8) client or computer ports 22 for connecting as many computers.

The computers 12, 14 and 16 typically comprise notebook or handheld computers provided with network interface cards or adapters 24. Examples of such adapters 24 are the Ethernet PC Cards and Ethernet/Modem Combo PC Cards manufactured by Xircom, Inc., Thousand Oaks, Calif. A flat, Category 5 compliant LAN cable 26 terminated with an RJ-45 modular plug 28 connects each of the computers 12, 14 and 16 with the system 10. The system 10 is a compact unit designed to be placed on a conference room table top 30 a portion of which is shown in FIG. 1. A default mode for the operation of the system 10 might be client-to-enterprise LAN access. The network communications system 10 may also operate as a stand alone client concentrator facilitating networking among the users within a conference room with or without connection to a backbone network.

The network communications system 10 is connectable to a standard electrical power wall outlet 32 and to the Ethernet LAN 18.by means of an adapter assembly 34. The adapter assembly 34 includes a power cord 36 for connection to the wall outlet 32; an Ethernet LAN cable 38 terminated with an RJ-45 modular plug 40 for connection to the LAN wall jack 20, and a combined power/Ethernet LAN cable 42 described in greater detail below. In addition, in accordance with a preferred embodiment of the invention, the system 10 may be coupled to a second, cascaded network communications system 44. Up to three (3) 8-port systems may be 10 cascaded or daisy chained in this fashion thereby facilitating the networking of up to twenty-four (24) computers. Such cascading is effected by means of combined power/Ethernet LAN daisy chain cables 46 and 48, also described in greater detail below.

Figure 3:
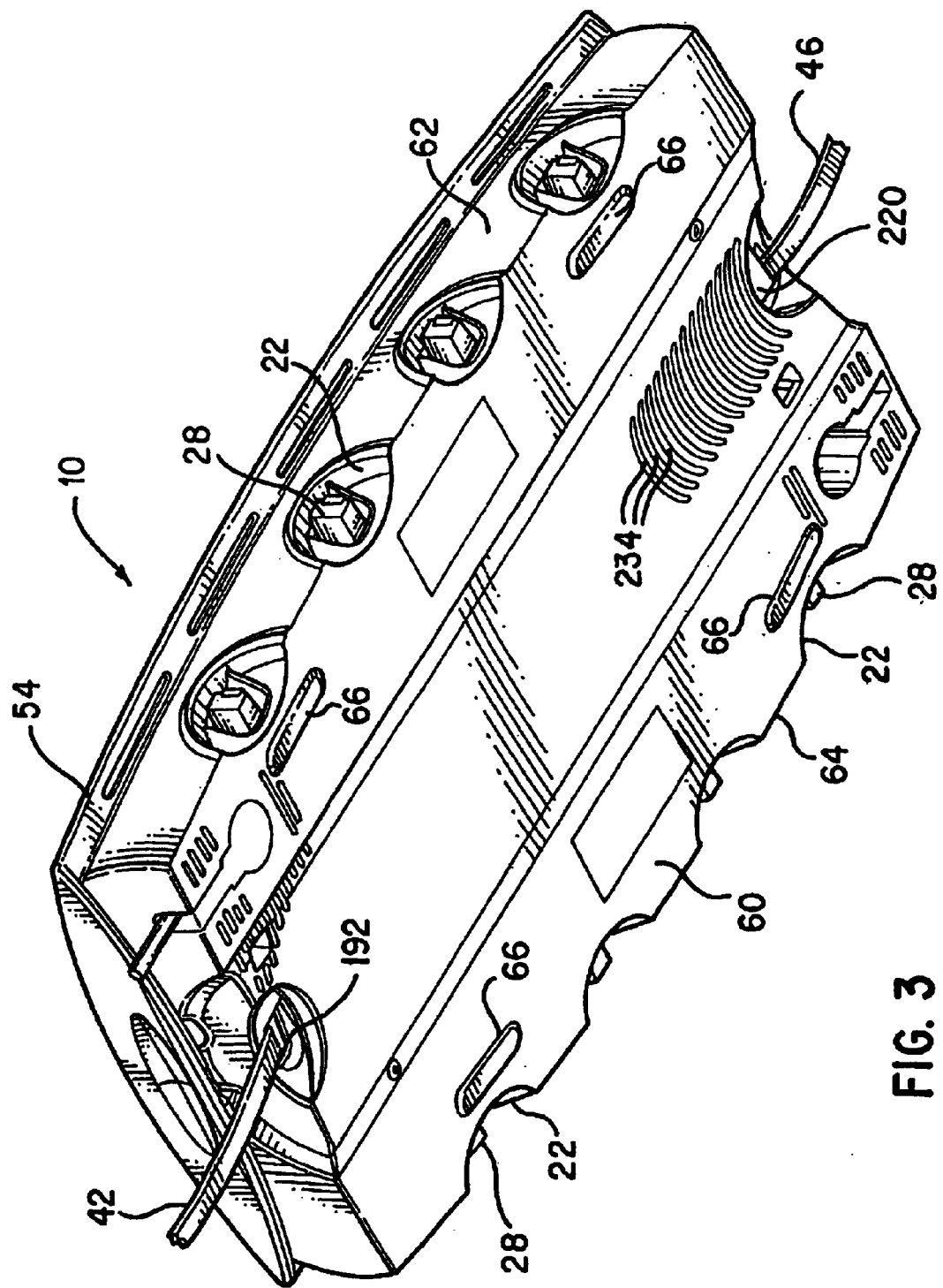
FIG. 3 is a bottom perspective view of the system shown in FIG. 2.
Figure 4:
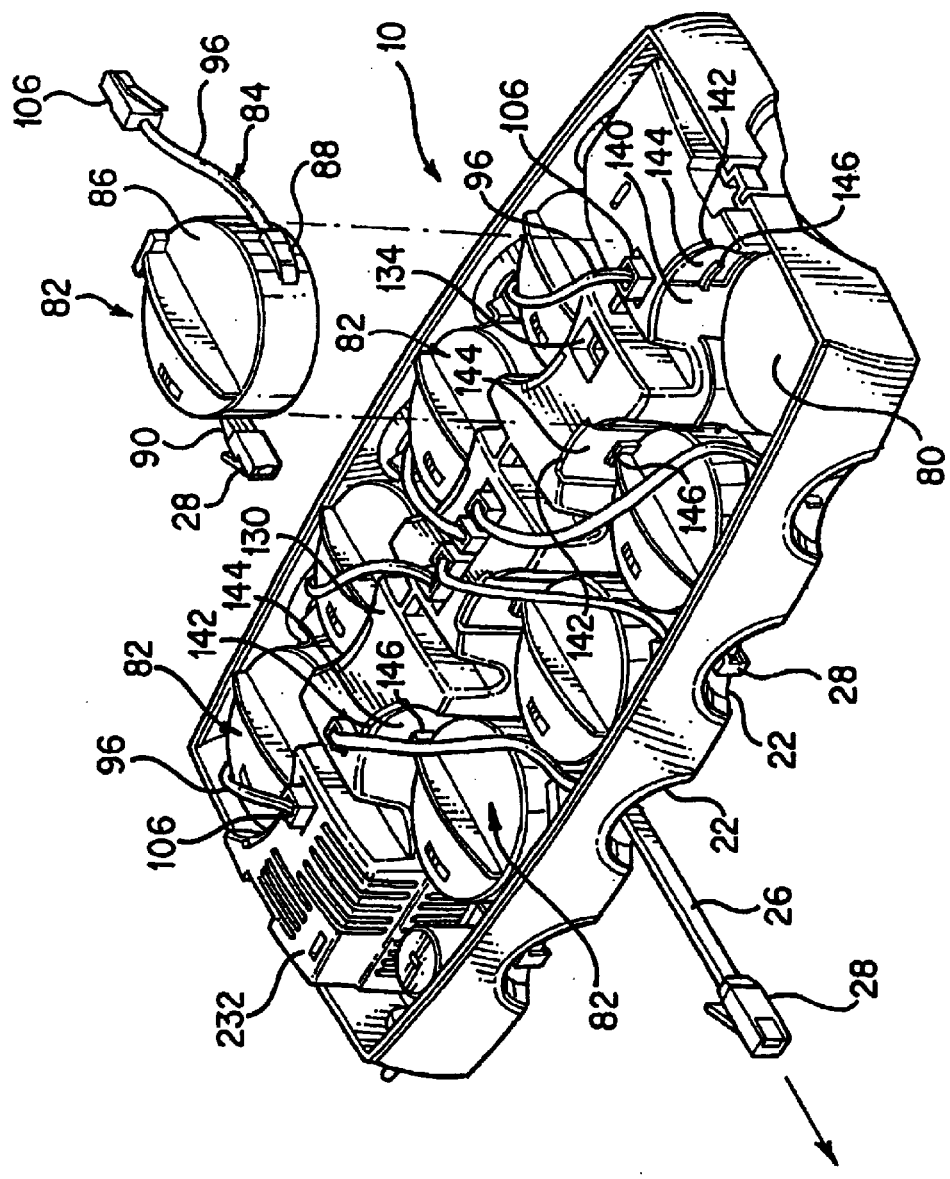
FIG. 4 is a top perspective view of the system of the invention with the housing cover removed.
Figure 5:
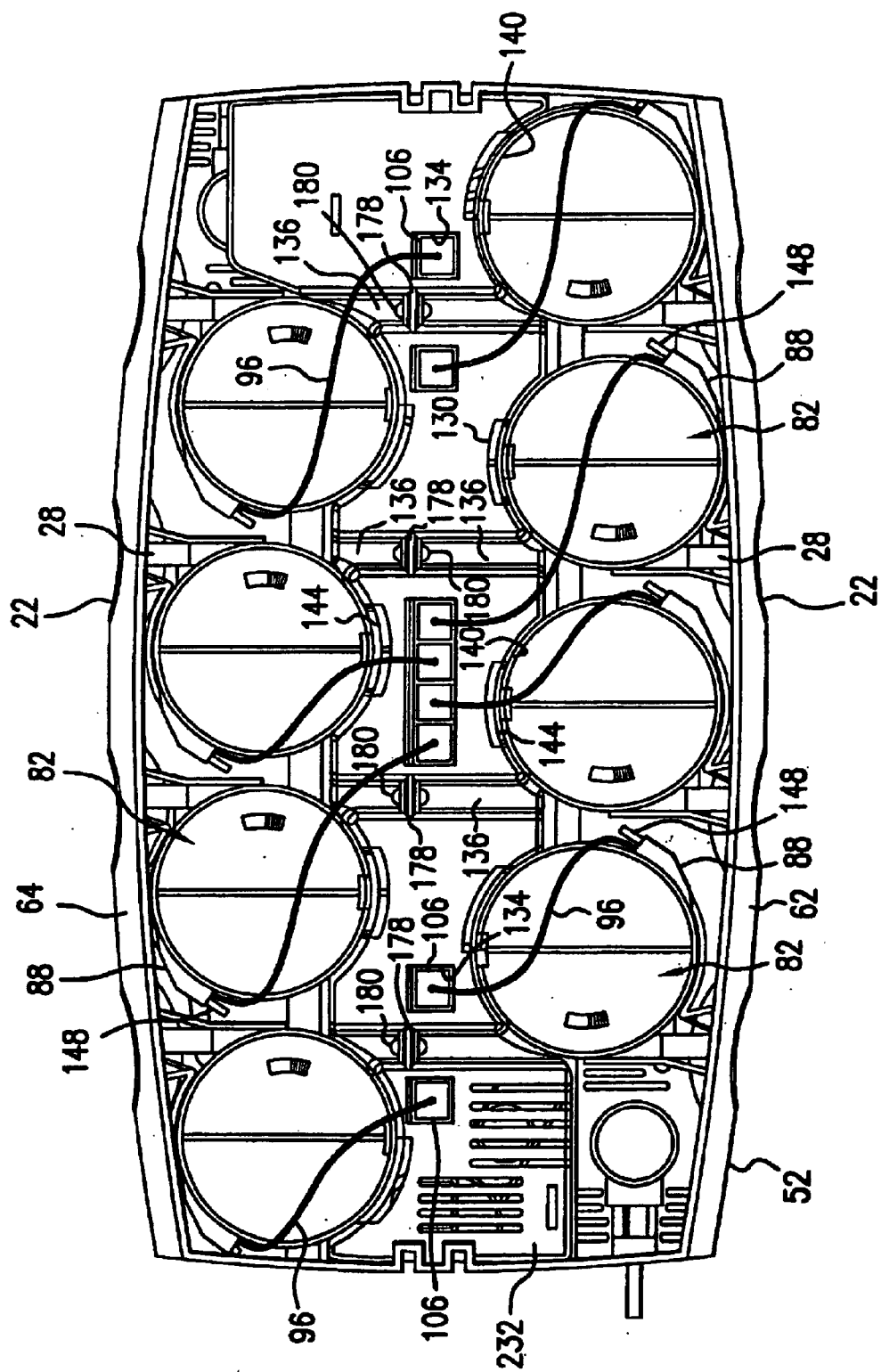
FIG. 5 is a top plan view of the system shown in FIG. 4.

With reference now also to FIGS. 2–5, the system 10 comprises an outer housing 50 including a base 52 and a cover 54, each preferably fabricated of molded plastic. The base 52 of the outer housing 50 includes a bottom wall 56 having inner and outer surfaces.58 and 60, and opposite side walls 62 and 64 defining the eight (8) client computer ports 22 from each of which a flat LAN cable 26 may be pulled out by a user for connection to a computer. Four rubber feet 66 attached to bottom wall 56 adjacent the corners thereof help resist any tendency for the system 10 to slide along the table top 30 when a cable is withdrawn from a client port 22. The four client ports 22 along one side 62 of the base 52 are in transverse alignment with the four client ports 22 along the other side 64 of the base 52, as best seen in FIG. 5. The cover 54 has a generally horizontal top wall 68 having an inner surface 70 and an outer surface 72.

Figure 6:
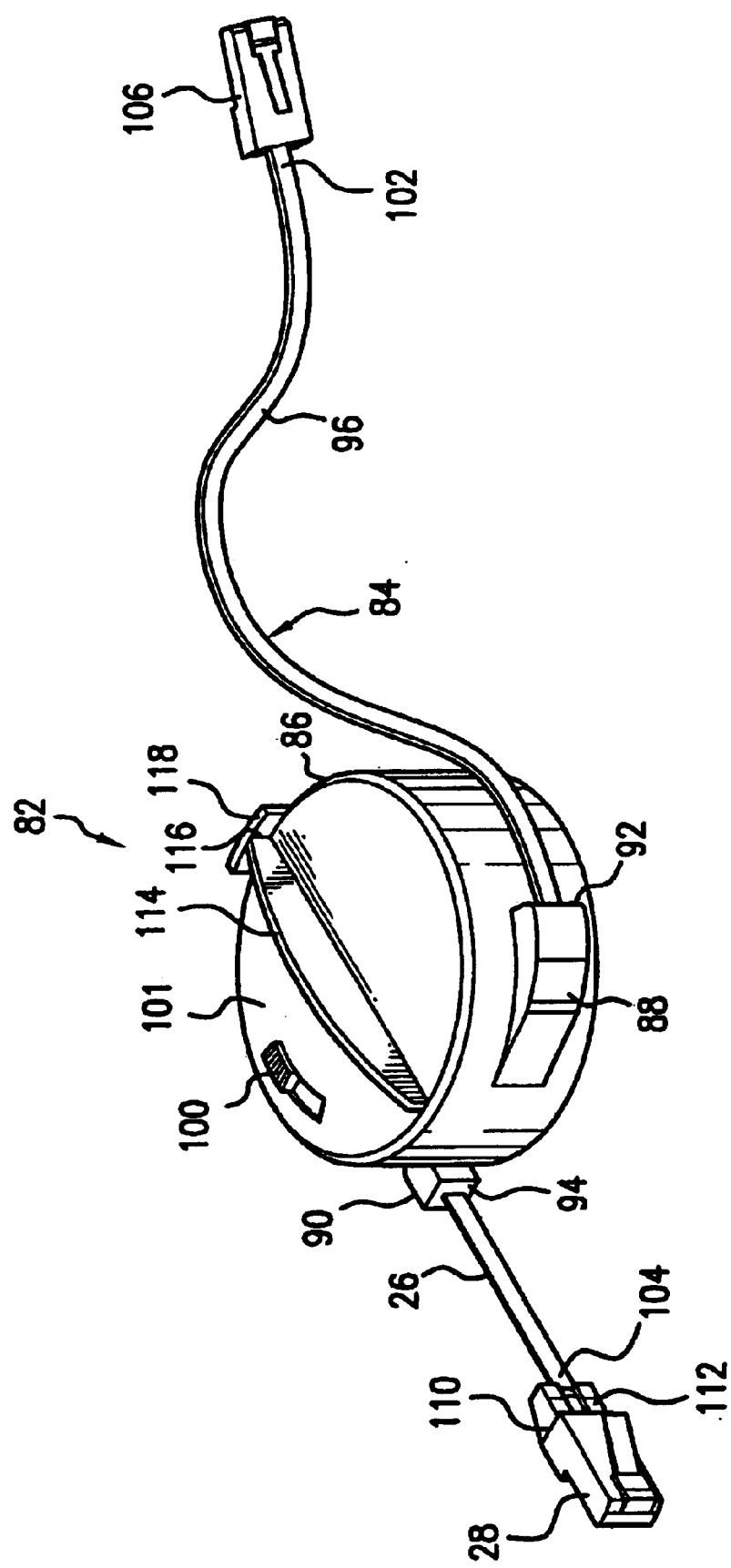
FIG. 6 is a perspective view of a LAN communications cable take-up device used in connection with the present invention.
Figure 7:
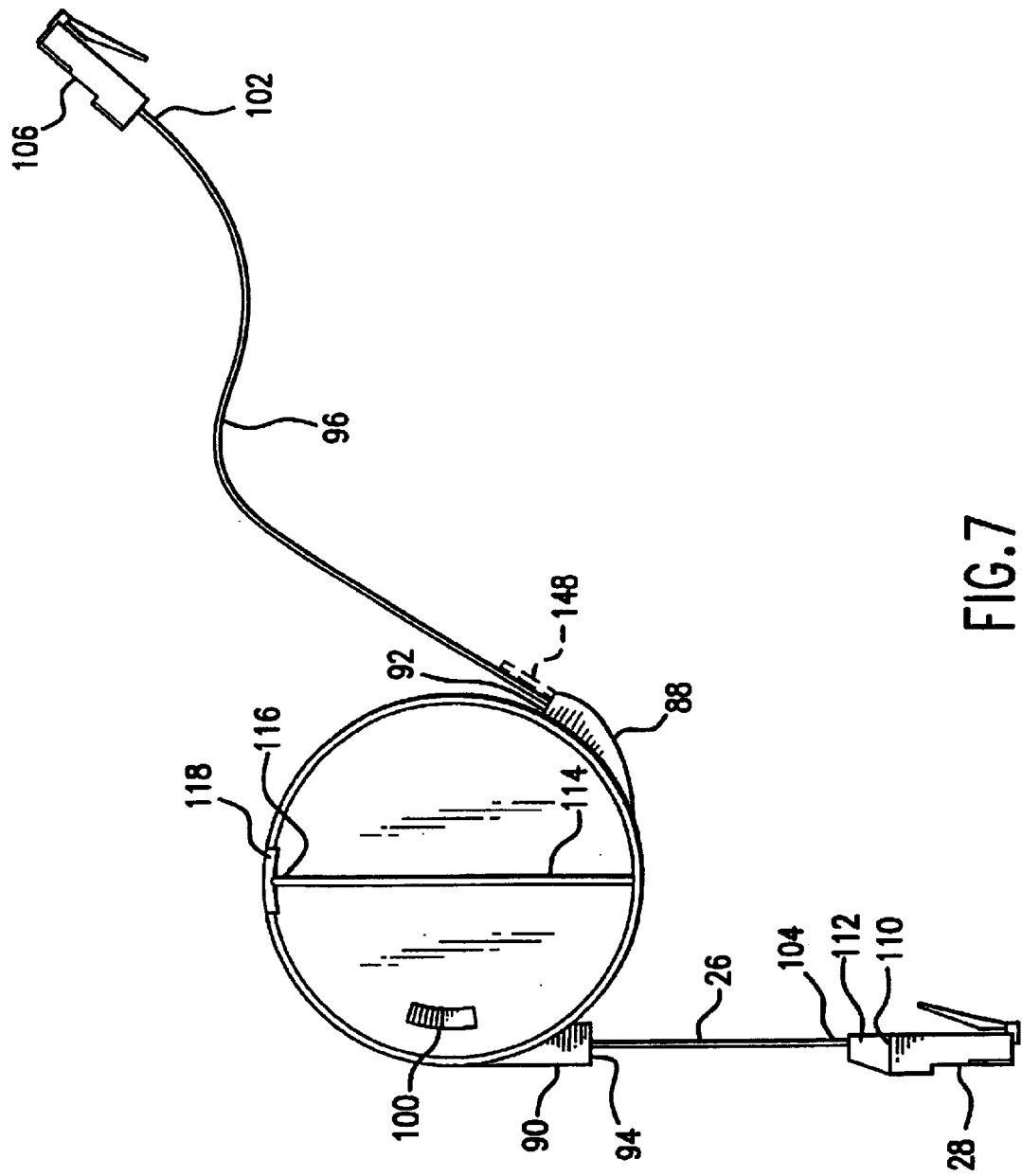
FIG. 7 is a top plan view of the cable take-up device of FIG. 6.

The inner surface 58 of the bottom wall 56 of the base 52 defines eight (8) wells 80 each of which is positioned adjacent one of the client ports 22. With reference now also to FIGS. 6 and 7, removably mounted within each of the wells 80 is a generally cylindrical Communications cable dispenser 82. The dispensers 82 are identical; each preferably takes the form of a take-up device containing a spring loaded reel carrying communications cable 84. A cable dispenser or take-up device of the type that may be used with the present invention is generally disclosed in U.S. Pat. Nos. 5,797,558 and 5,655,726, which patents are incorporated herein by reference. As already indicated, in the preferred embodiment under consideration, the communications cable 84 carried by the reel of each cable dispenser 82 is in the form of flat, Category 5 twisted pair 10/100 Mbps Ethernet transceiver cable. Each cable dispenser 82 has a casing 86 including two projections 88 and 90 on the outer surface thereof. The projection 88 has a transverse surface 92 and the projection 90 has a transverse surface 94. The cable 84 of each cable dispenser 82 has a first portion 96 that emerges from an aperture in the transverse surface 92 of the projection 88. The first portion 96 of the cable 84 is fixed, that is, it is non-extendible relative to the cable dispenser 82. The cable 84 includes as a second portion the cable length 26 that is extendible from an aperture in the transverse surface 94 of the projection 90 against a resilient bias provided, for example, by a flat coil spring within the dispenser 82, and is thereby retractable into the dispenser. Further, in the present invention, the cable dispenser preferably includes a mechanism for allowing the cable to be latched in an extended state to relieve strain on the cable during use. A mechanical switch 100 in the top surface 101 of the cable dispenser casing 86 allows a user to select latching or non-latching reel operation. The length of the second portion 26 of the cable 84 is compatible with typical conference room environments, for example, six to eight feet long. The first and second portions 96 and 26 of the cable 84 have ends 102 and 104, respectively, carrying an RJ-45 modular plug 106 and the RJ-45 modular plug 28. The plug 28 has a rear surface 110 provided with a slotted, resilient pad 112 that engages the transverse surface 94 of the projection 90 on the casing 86 to absorb shock in the event a user suddenly releases the extended cable portion 26. Mounted on the top surface 101 of the dispenser casing 86 and extending along a diameter thereof, is an upwardly projecting, flat grip or handle 114 facilitating the lifting of the cable dispenser 82 and the removal thereof from its associated well 80. Adjacent the inner end 116 of the handle 114 and disposed perpendicular thereto is a short, upstanding abutment 118.

The base 52 of the system 10 includes a molded plastic inner housing 130 extending the length of the base. The inner housing 130 has a horizontal upper wall 132 that defines eight (8) longitudinally spaced jack apertures 134 and four transverse channels 136, each channel being in alignment with a pair of opposed client ports 22. The inner housing 130 further includes a generally vertical wall 138 defining eight (8) arcuate recesses 140 for receiving the inner portions of the cable dispensers 82. A portion of the vertical wall 138 in each arcuate recess 140 is slotted (at 142) so as to define a generally U-shaped, resilient tab 144 hinged along the bottom thereof. The resilient tab 144 carries an outwardly projecting latch 146 that engages the top of the abutment 118 on the top of the associated cable dispenser 82 to lock the dispenser in place and prevent it from being lifted. To remove a cable dispenser 82 for replacement, the associated resilient tab 144 is pressed inwardly, that is, away from the dispenser, thereby causing the latch 146 to clear the associated abutment 118 thus allowing the dispenser to be lifted out of its well 80 by means of the handle 114. Projecting upwardly from the inner surface 58 of the bottom base wall 56 is a stop 148 that engages the transverse surface 94 on the dispenser projection 90. The stop 148 thereby prevents the cable dispenser 82 from rotating counterclockwise within its well 80 when the second portion 26 of the cable 84 is withdrawn from the dispenser.

Figure 8:
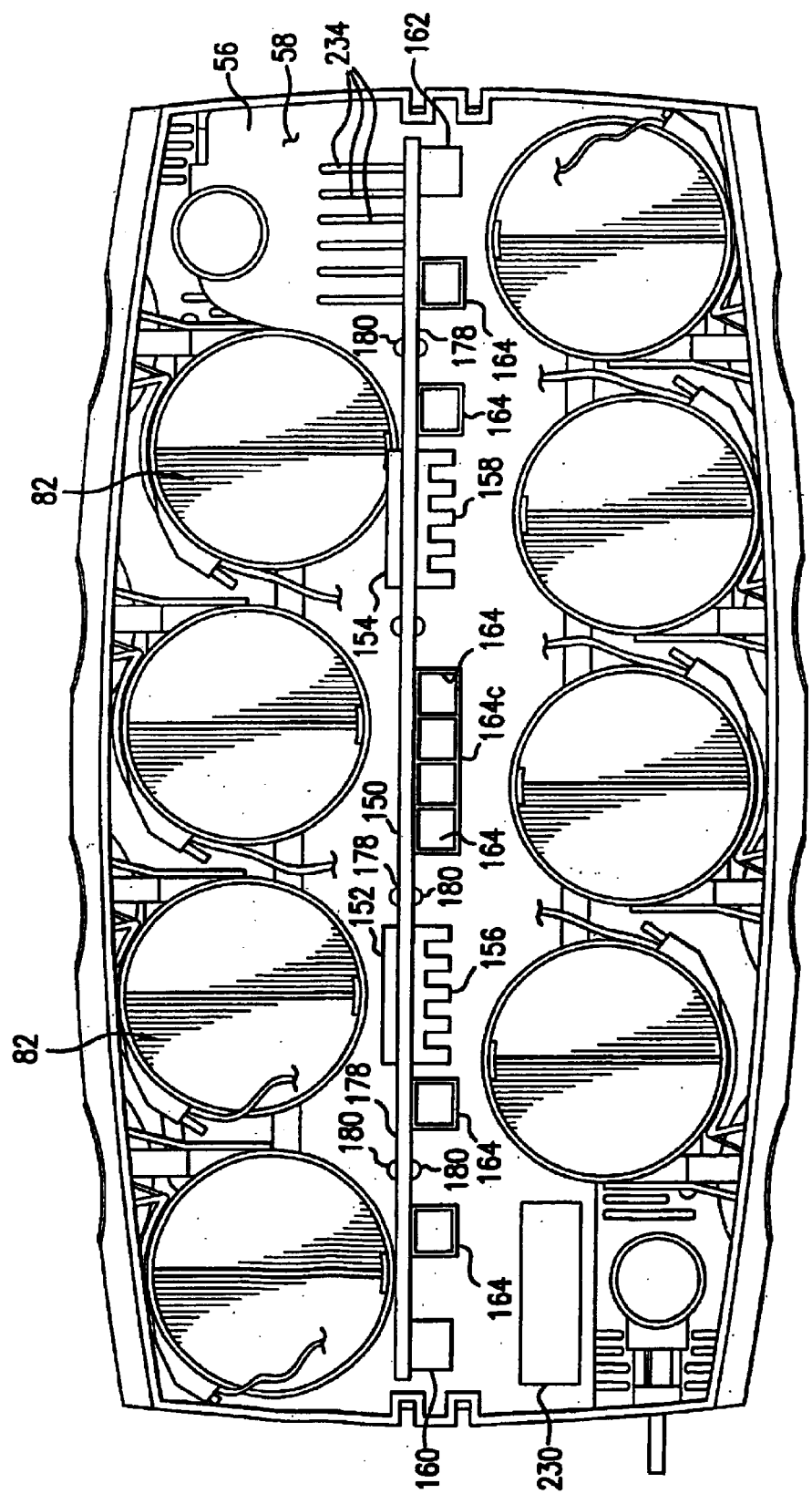
FIG. 8 is a top plan view of the system as seen in FIG. 5 with the inner housing cover removed, exposing the printed circuit board (PCB)
Figure 9:
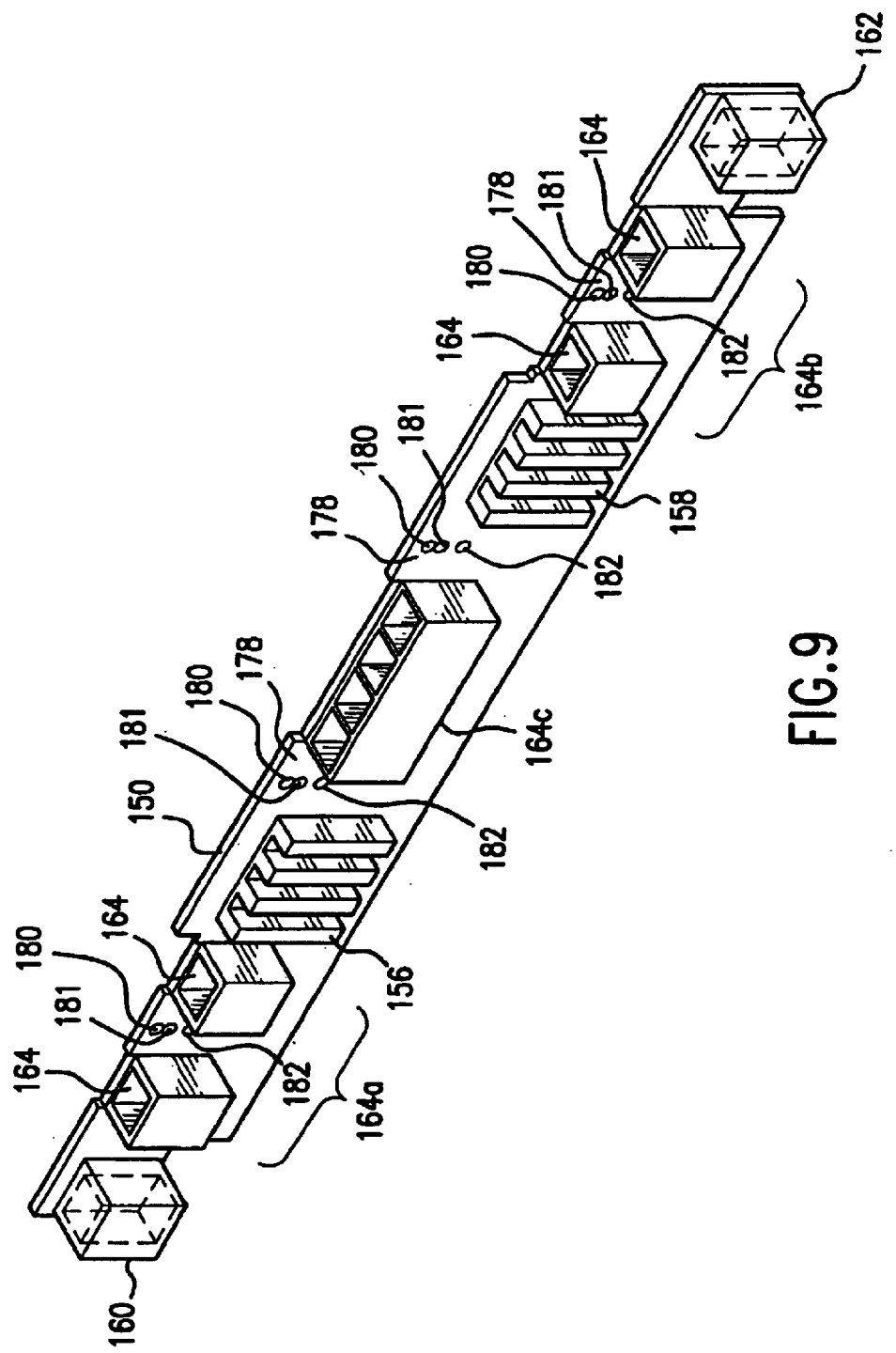
FIG. 9 is a perspective view of the PCB.

FIG. 8 is a top plan view of the base of the communications system with the inner housing 130 removed thereby exposing a printed circuit board (PCB) 150 extending substantially the length of the base 52. FIG. 9 is a perspective of the PCB 150. Mounted on one surface of the PCB 150 are first and second monolithic integrated circuits 152 and 154 comprising network interconnection circuitry preferably in the form of LAN switches. Mounted on the other surface of the PCB 150 opposite the LAN switch IC's 152 and 154 are heat sinks 156 and 158, respectively, for transferring heat away from the switches. The PCB 150 also carries an inverted 10-contact RJ-45 jack 160 at one end, of the PCB 150 for connection to the combined power/Ethernet LAN cable 42 of the adapter assembly 34, and an inverted 10-contact RJ-45 jack 162 at the other end of the PCB 150 for connecting the system 10 to the second communications system 44 by means of the combined power/Ethernet LAN daisy chain cable 46. The PCB 150 further carries eight (8) upright client port RJ-45 jacks 164 intermediate the ends of the PCB. The jacks 164 are arranged as two pairs 164a, 164b of individual jacks and a central jack complex 164c integrating the remaining four RJ-45 jacks 164 in a single unit. With the inner housing 130 in place in the base 52, the eight client port jacks 164 carried by the PCB line up with the jack apertures 134 in the upper wall 132 of the inner housing 130.

Figure 10:
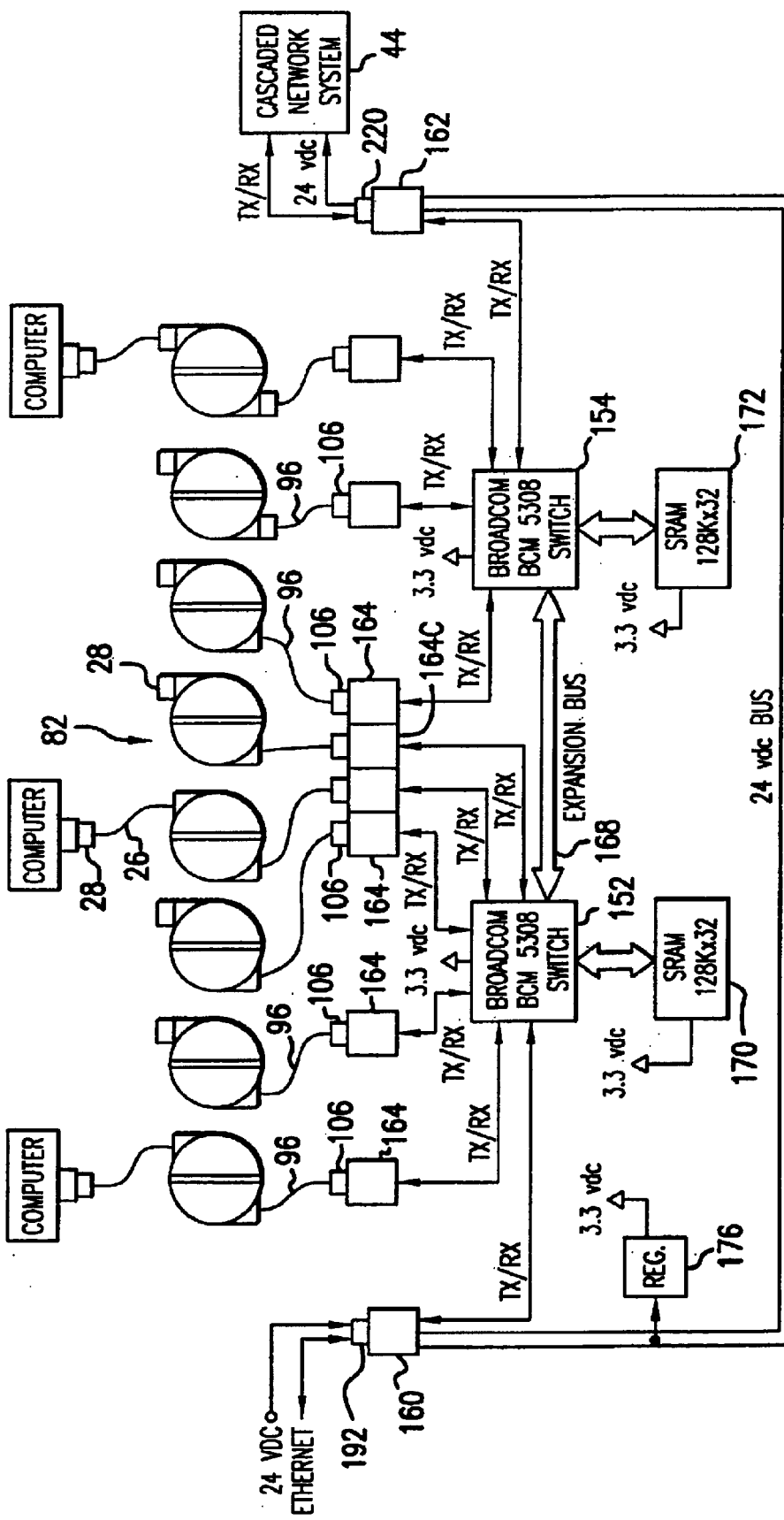
FIG. 10 is a block diagram of the electronic circuitry of the first embodiment of the system.

FIG. 10 is a high-level block diagram of the electronics of the 8-port network communications system 10. As shown in FIG. 10, the first switch 152 may comprise, by way of example, a Model BCM5308 single chip, 3.3 volt 10/100 BASE-T/TX 9-port switch manufactured by Broadcom Corp. The second switch 154 may comprise a Model BCM5304 single chip, 3.3 volt 10/100 BASE-T/TX 5-port switch also manufactured by Broadcom Corp. The switches 152 and 154 are connected by an expansion bus 168 and are coupled to SRAM buffer memories 170 and 172, respectively. Six transmit/receive ports of the first switch 152 interface with the enterprise power/Ethernet RJ-45 jack 160 and five of the client port RJ-45 jacks 164 which receive the mating RJ-45 plugs 106 on the ends 102 of the fixed cable portions 96. Three transmit/receive ports of the second switch 154 interface with the RJ-45 jacks 164 of the remaining three client ports. A fourth transmit/receive port of the second switch 154 interfaces with the cascade or daisy chain RJ-45 jack 162. A pass-through 24 vdc power bus 174 for supplying cascaded systems such as the system 44 is connected between the power/Ethernet and daisy chain jacks 160 and 162. Connected to the 24 vdc bus 174 is a regulator 176 for supplying 3.3 vdc to the various IC's carried by the PCB 150.

The use of multiport network interconnecting circuits such as the LAN switches 152 and 154 and their connection to LAN port jacks are well known in the art and need not be described in greater detail. It will also be obvious to those skilled in the art that instead of a LAN switching arrangement, the system may be set up as a less expensive, conventional concentrator or repeater hub.

Figure 11:
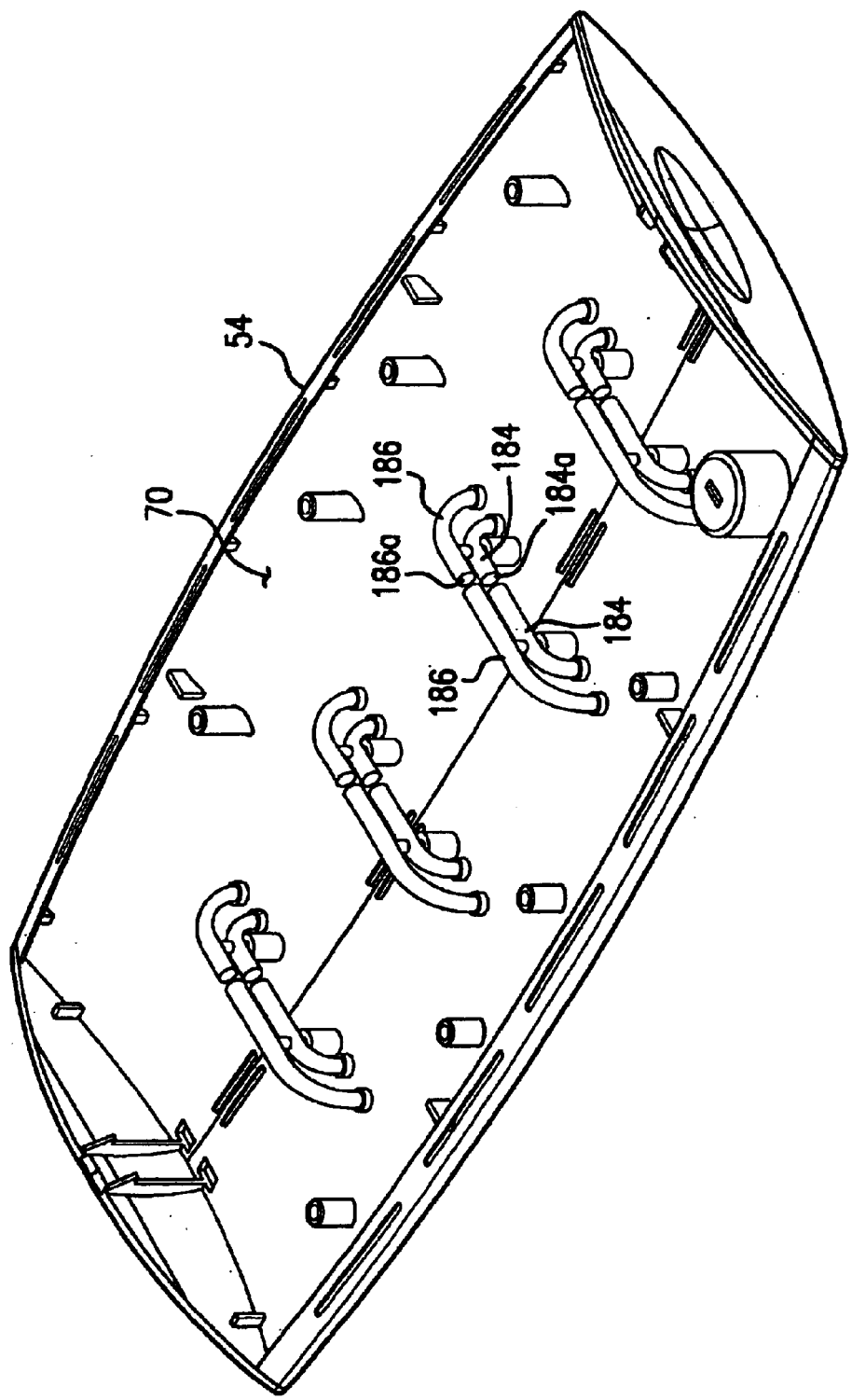
FIG. 11 is a perspective view of the interior of the housing cover.
Figure 12:
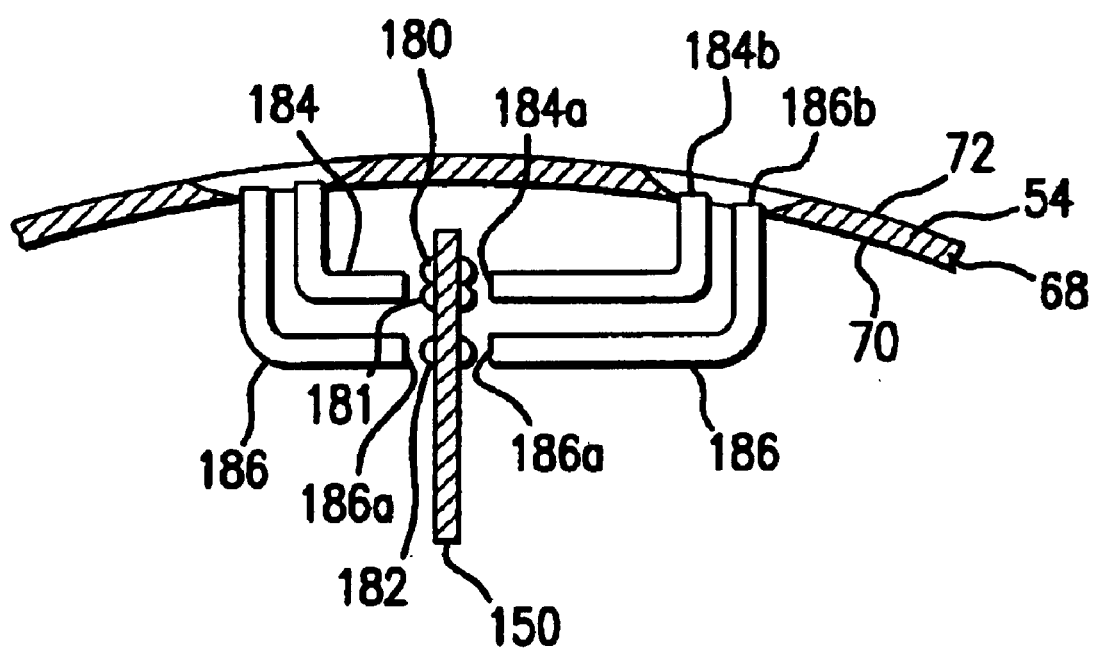
FIG. 12 is a simplified, transverse cross section of a portion of the PCB and housing cover, as seen along the line 12—12 in FIG. 1.

The system 10 also includes means for providing a visual indication of the status of each of the client ports 22. With reference to FIGS. 4 and 5, with the inner housing 130 in place, four portions 178 of the PCB 150 are exposed by the transverse channels 136 defined by the inner housing. With reference also to FIGS. 8, 9 and 12, each of the exposed portions 178 of the PCB carry a set of three status indicating LEDs 180–182 on each side of the PCB, each set of LEDs being associated with one of the client ports 22. The LEDs of each set are vertically aligned with the upper two LEDs 180 and 181 in close proximity to each other and the third LED 182 being below and spaced apart from the upper pair. The upper pair of LEDs 180, 181 of each LED set indicates (through 2 different colors) link integrity, that is, whether a good 10 Mbps or 100 Mbps connection has been made, while the third LED 182 of each set indicates LAN send/receive activity. Light from the LEDs is transmitted to the exterior surface 72 of the cover 154 via light pipes of Lexan or the like. Specifically, as shown in FIGS. 11 and 12, each client port has associated with it a pair of vertically aligned, upper and lower, L-shaped light pipes 184 and 186 carried by the inner surface 70 of the cover 54. The light pipe 184 has an inner end 184a and an outer end 184b. Likewise, the light pipe 186 has inner and outer ends 186a and 186b. With the outer housing cover 54 in place, the inner end 184a of the upper light pipe 184 is positioned to receive light from one or the other of the LEDs 180, 181 of the upper LED pair;

similarly, the inner end 186a of the lower light pipe 186 is positioned to receive light from the lower LED 182 when the cover 54 is in place. The outer ends 184b and 186b of the light pipes 184 and 186 communicate with the outer surface 72 of the cover 54 and thus light transmitted by the light pipes from the LEDs is visible to the users of the system to indicate the status of each client port 22. The use of LEDs to indicate the status of LAN ports is well known in the art, being routinely used, by way of example, in connection with network interface cards or adapters such as those mentioned above.

Figure 13:
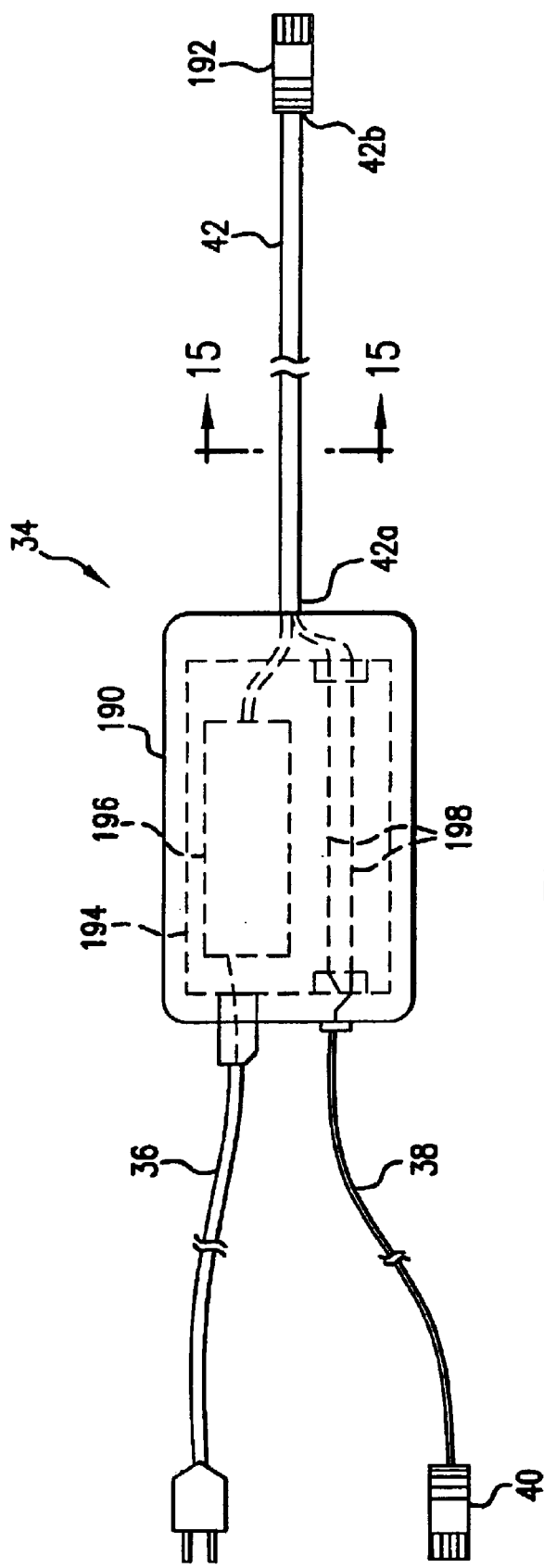
FIG. 13 is a top plan view of an adapter assembly including a combined power/LAN cable, for connecting a network communications system of the invention with a source of electrical power and an enterprise Ethernet LAN.

FIG. 13 shows the details of the adapter assembly 34 for connecting the system 10 to the enterprise LAN 18 and the source of electrical power 32. The adapter assembly 34 comprises an enclosure 190, the combined power/Ethernet LAN cable 42 extending from one end of the 20 enclosure 190, and the 120 vac power cord 36 and Category 5 compliant Ethernet LAN cable 38 extending from the other end of the enclosure 190. With reference also to FIGS. 3 and 10, the combined power/Ethernet LAN cable 42 has first and second ends 42a and 42b and is terminated at the end 42b with a 10-contact position RJ-45 modular plug 192 for connection to the internal jack 160, while, as already indicated, the LAN cable 38 is terminated with an eight contact RJ-45 modular plug 40 for connection to the wall LAN jack 20. The enclosure 190 contains a PCB 194 carrying a 120 vac-to-24 vdc power supply 196 connected to the power cord 36 and conductors 198 providing a pass-through for the Ethernet LAN signals. By way of example, the overall length of the adapter assembly of FIG. 13 may be 25 feet.

Figure 15:
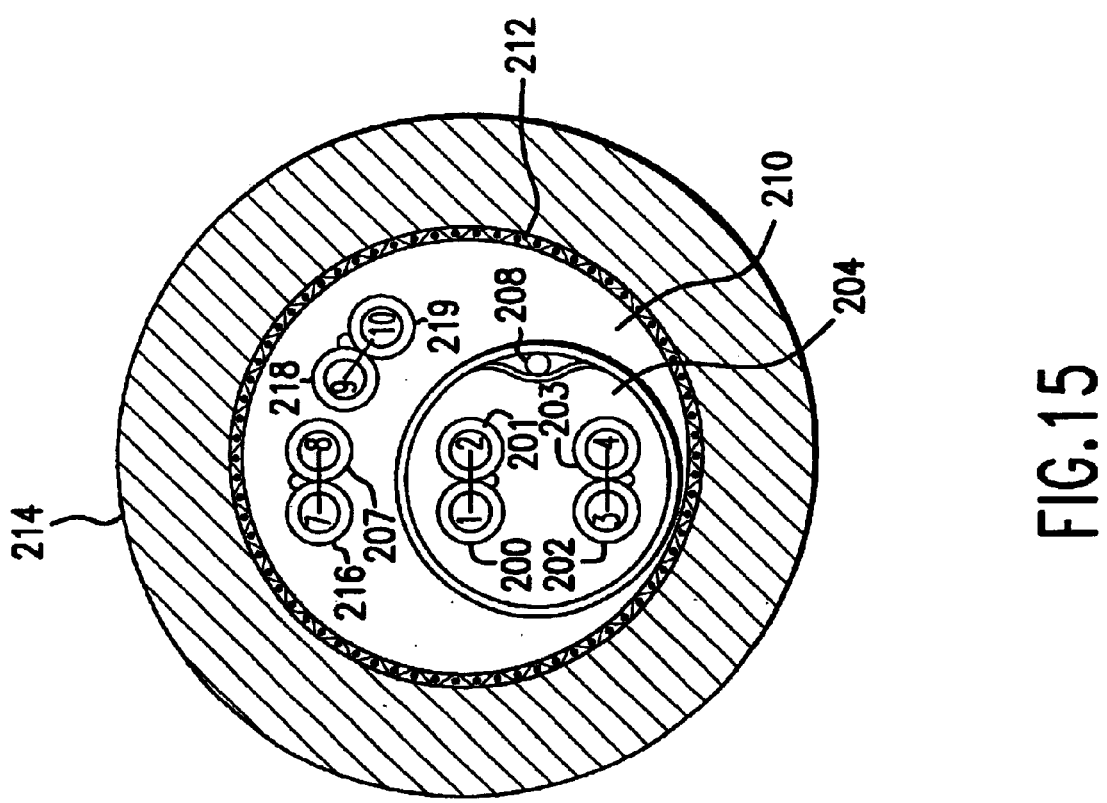
FIG. 15 is a cross section view of the combined power/LAN cables of FIGS. 13 and 14 as seen along the lines 15—15 therein.

As shown in the cross section of FIG. 15, the combined power/Ethernet cable 42 includes a core group of Category 5 compliant conductors comprising two twisted wire pairs 200/201 and 202/203 connected to the pass-through conductors 198 for transmitting network signals. The core group of conductors 200–203 is encased in insulative filler material (for example, fibrillated polypropylene) 204 in turn enveloped by a tubular, double sided aluminum foil/mylar EMI/RFI shield 206 having a drain line 208. The shielding 206 is surrounded by fibrillated polypropylene filler 210 which in turn is enveloped by a braided EMI/RFI shield 212 and an outer tubular insulative jacket 214 of, for example, flexible PVC. Embedded in the filler 210 is an outer group of conductors comprising two twisted wire pairs 216/217 and 218/219 connected to the power supply 196 for supplying 24 vdc electrical power to the system 10.

Figure 14:
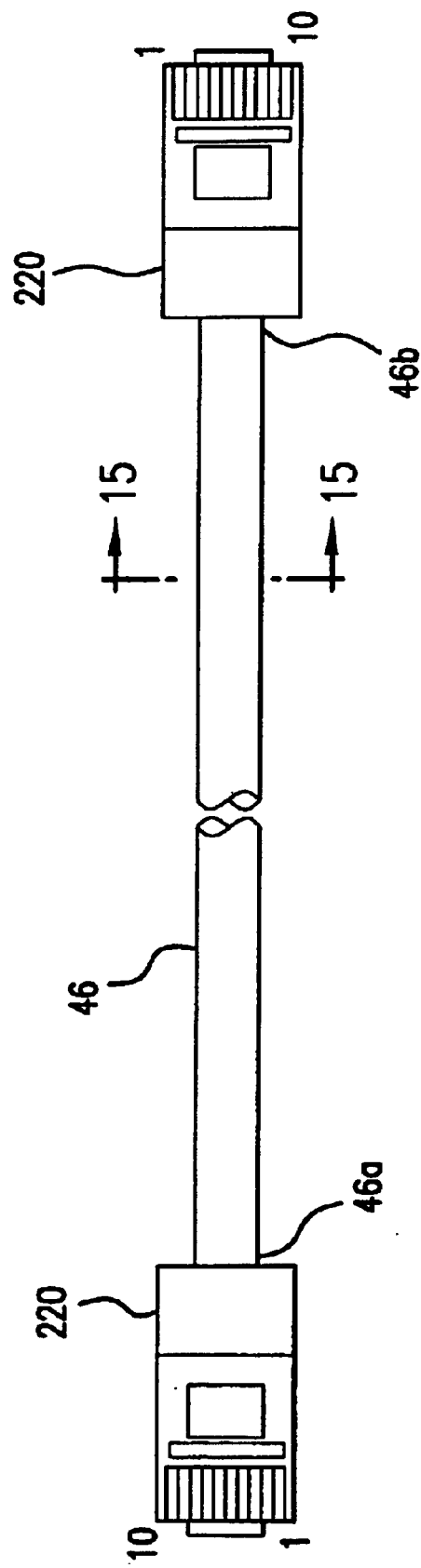
FIG. 14 is a top plan view of a combined power/LAN cable for cascading network communications systems of the present invention.

With reference to FIG. 14, the combined power/LAN cable 46 for cascading the systems 10 and 44 is identical to the combined power/LAN cable 42 of the adapter assembly 34 except that the cascading cable 46 is terminated at each of the first and second ends 46a and 46b with a 10-contact RJ-45 modular plug 220. With reference also to FIGS. 3 and 10, to cascade the systems of the invention, one of the plugs 220 is inserted in the daisy chain RJ-45 jack 162 of the first system such as the system 10 while the other plug 220 is inserted in the enterprise RJ-45 jack 160 of the second system such as the system 44. The overall length of the cable 46 may be 6 feet, for example.

FIG. 16 is a chart listing the pin or contact assignments of the mating 10-contact RJ-45 modular plugs and jacks used in the system of the present invention. Thus, the conductors 200/201 and 202/203 of the core or LAN group of conductors are connected to, contact Nos. 1–4 while the conductors 216/217 and 218/219 of the outer or power group of conductors are connected to contact Nos. 7–10. Middle contact positions Nos. 5 and 6 are devoid of contacts so as to provide additional electrical isolation between the two groups of conductors.

With reference again to FIGS. 3–5 and 8, in the event heat dissipation from the LAN switch ICs 152 and 154 through the use of heat sinks 156, 158 alone is insufficient, a cooling fan 230 housed within a slotted enclosure 232 at one end of the system 10 may be provided. Cooling air discharge slots 234 formed in the bottom wall 56 of the base 52 at the other end of the system 10 vent cooling air flowing along the length of the PCB 150.

Figure 17:
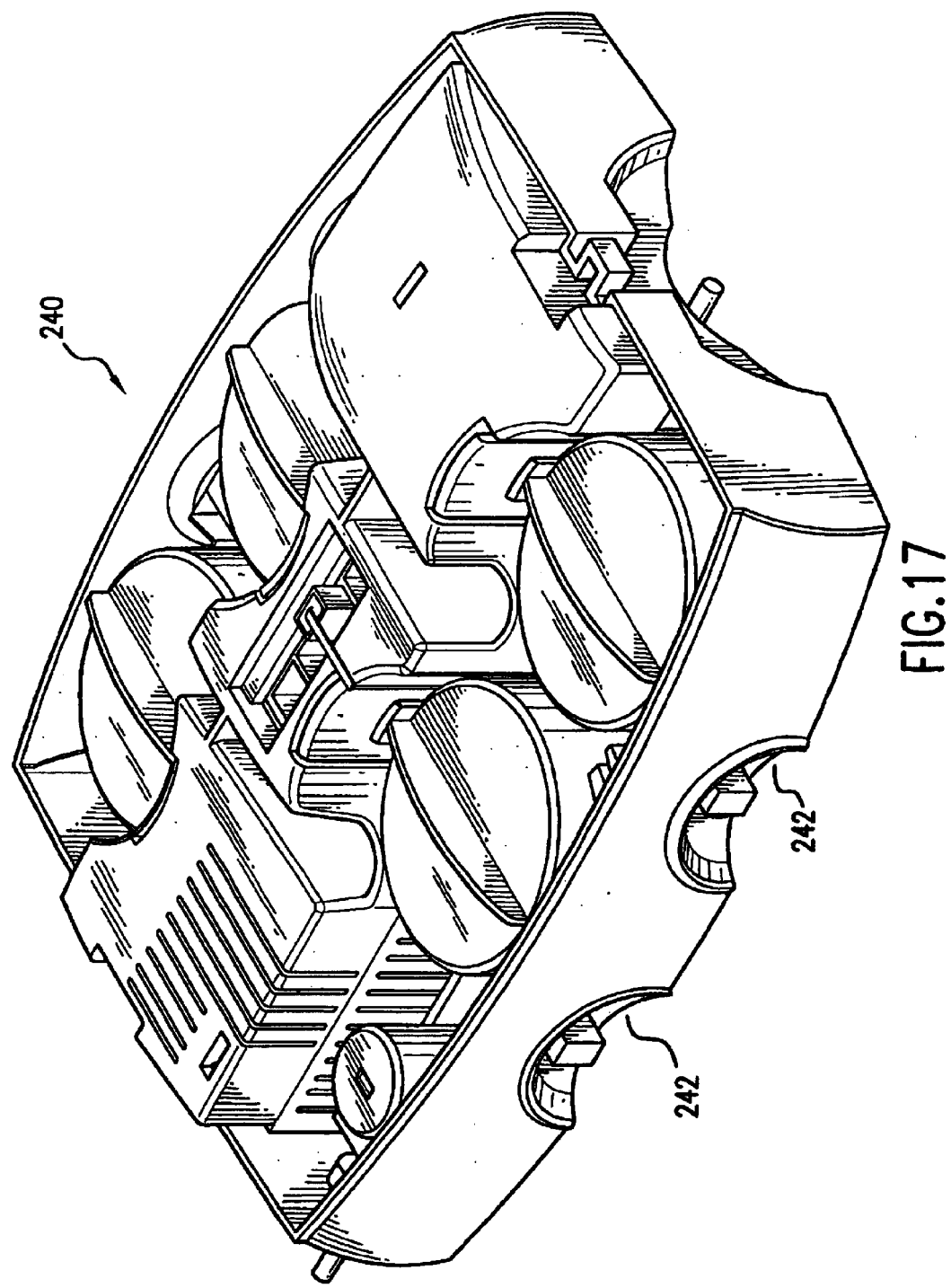
FIG. 17 is a perspective view of a 4-port network communications system in accordance with a second embodiment of the present invention.

With reference to FIG. 17, there is shown an alternative embodiment of the invention comprising a system 240 having four client computer ports 242 two of which are visible in FIG. 17. It will be evident that the preceding detailed description applies equally to the four port version of the invention, except that typically only a single LAN switching IC would be required.

While the invention has been particularly shown and described with reference to preferred embodiments thereof, it will be understood by those skilled in the art that the foregoing and other changes in form and detail may be made therein without departing from the scope of the invention as defined by the appended claims. For example, it will be appreciated by those skilled in the art that the invention is equally applicable to "small office/home office" (SOHO) environments.

What is claimed is:

1. A system comprising:
   multiport circuitry having a plurality of ports to interconnect a plurality of computers in a network;
   a plurality of network communications cable dispensing devices; and a plurality of network communications cables each communications cable having a first portion and a second portion, the first portion of the communications cable having an extremity including a first connector adapted to be coupled to one of the ports of the multiport circuitry, the second portion of the communications cable being extendible from and retractable into a cable dispensing device and having an extremity including a second connector adapted to be coupled to one of the computers.

2. The system of claim 1, wherein the multiport interconnecting circuitry includes a network switching circuit.

3. The system of claim 1, wherein the second portion of the communications cable is retractable into the cable dispensing device under a spring load.

4. The system of claim 1, wherein:
   the communications cable comprises flat, Category 5 compliant LAN cable including two twisted wire pairs; and
   the connector at the extremity of each of the first and second portions of the communications cable comprises an RJ-45 modular plug.

5. The system of claim 1, further comprising a combined power/network cable for connecting the multiport circuitry to a local area network and to a source of electrical power.

6. The system of claim 1, wherein the multiport circuitry includes a connector for coupling the system to a second network communications system in daisy chain fashion.

7. A system, as defined in claim 1, in which:
   the cable dispensing devices are removable latched in place in the system.

8. The system of claim 1, further comprising:
   a housing having a base including a side wall and defining a plurality of internal wells, the side wall of the base defining a plurality of client computer ports, each client port communicating with one of the wells; and
   a plurality of standard, modular LAN jacks mounted in the housing and corresponding in number to the number of recesses, each LAN jack being adapted to receive a standard modular LAN plug; and wherein the network communication cable dispensing devices are removably mounted within each of the wells;

wherein the first portion of the communications cable is fixed relative to the cable dispensing device;

a standard modular LAN plug adapted to be received by one of the LAN jacks; and wherein the second connector comprises a standard modular LAN plug adapted to be received by a corresponding jack on one of the computers.

9. The system of claim 8, wherein the interconnection circuitry comprises a LAN switch, and the standard modular LAN jacks and plugs are of the RJ-45 type.

10. The system of claim 8 wherein the multiport interconnection circuitry further includes a port adapted to be connected to the multiport interconnection circuitry of a cascaded network communications system.

11. The system of claim 8, further comprising:

a combined power/LAN cable having a first set of conductors for connecting the multiport interconnection circuitry to a source of electrical power and a second set of conductors for carrying network signals between the system and the LAN.

12. The system of claim 8, wherein:

the housing includes a cover having an outer surface;

the multiport circuitry includes light emitters for indicating the status of the computer ports; and the cover carries light pipes positioned relative to the light emitters so as to transmit light from the light emitters to the outer surface of the cover to provide a visual indication to a user of client port status.

13. The system of claim 8, wherein each cable dispensing device includes an upper surface carrying a handle facilitating removal of the device from the associated well.

14. The system of claim 8, wherein the second connector includes a resilient pad for absorbing shock resulting from the sudden release of the second portion of the cable from an extended position.

15. The system of claim 1, wherein the communications cables comprise:

a first group of conductors comprising two twisted wire pairs for transmitting Ethernet LAN signals, the first connector being adapted to be connected to an Ethernet LAN;

a second group of conductors extending generally parallel with the first group of conductors extending generally parallel with the first group of conductors and comprising two twisted wire pairs for transmitting electrical power, the second group of conductors having a first end and a second end, the first end of the second group of conductors being adapted to be connected to a source of electrical power;

wherein the second connector comprises an insulative jacket enclosing the first and second groups of conductors; and an RJ-45 modular connector terminating the second end of the second group of conductors, the RJ-45 connector having at least eight contact positions, the conductors of the first group of conductors being connected to a first group of four of the contact positions of the RJ-45 connector and the conductors of the second group of conductors being connected to a second group of four of the contact positions of the RJ-45 connector.

16. The system of claim 15, wherein the first group of conductors comprise Category 5 compliant conductors extending generally parallel with the second group of conductors, the system further comprising an insulative jacket enclosing the first and second groups of conductors;

an electrical power cord; and a Category 5 compliant cable terminated with a second RJ-45 modular plug for connection to a LAN; and an enclosure attached to the first and second groups of conductors, the electrical power cord and the Category 5 compliant cable, the enclosure containing:

conductors interconnecting the Category 5 compliant cable and the first end of the first group of conductors; and a power supply interconnecting the power cord and the first end of the second group of conductors.

17. The system of claim 15, wherein the first group of conductors comprise Category 5 compliant conductors extending generally parallel with the second group of conductors, the system further comprising an insulative jacket enclosing the first and second groups of conductors, the system further comprising:

an electrical power cord; and a Category 5 compliant cable terminated with a second RJ-45 modular plug for connection to LAN; and an enclosure attached to the first and second groups of conductors, the electrical power cord and the Category 5 compliant cable, the enclosure containing conductors interconnecting the Category 5 compliant cable and the first end of the first group of conductors, and a power supply interconnecting the power cord and the first end of the second group of conductors.

18. The system of claim 15, further comprising a first EMI/RFI shield enclosing the first group of conductors.

19. The system of claim 18, further comprising a second EMI/RFI shield surrounding the first shield, the second group of conductors being disposed between the first and second shields.

20. The system of claim 15, wherein the RJ-45 modular connector has ten contact positions 1–10, the conductors of the first group of conductors being connected to contact positions 1–4 and the conductors of the second group of conductors being connected to contact positions 7–10.

21. The system of claim 20, wherein intermediate contact positions 5 and 6 of the RJ-45 connector are devoid of electrical contacts to provide electrical isolation between the first and second groups of conductors.

22. The system of claim 15, wherein the first connector comprises a second RJ-45 modular connector terminating the second group of conductors at the first end thereof, the second RJ-45 connector having at least eight contact positions, the conductors of the first group of conductors being connected to a first group of four of the contact positions of the second RJ-45 connector and the conductors of the second group of conductors being connected to a second group of four of the contact positions of the second RJ-45 connector.

23. The system of claim 22, wherein the second RJ-45 connector has ten contact positions 1–10, the conductors of the first group of conductors being connected to contact positions 1–4 and the conductors of the second group of conductors being connected to contact positions 7–10.

24. The system of claim 23, wherein intermediate contact position 5 and 6 of the second RJ-45 connector are devoid of electrical contacts to provide electrical isolation between the first and second groups of conductors.

25. A LAN cable dispensing device comprising:
- a casing; and
- a flat, Category 5 compliant LAN cable having a first portion and a second portion, the first portion of the LAN cable being fixed relative to the casing and having an extremity including a first RJ-45 modular plug and the second portion of the LAN cable being extendible from and retractable under spring load into the casing and having an extremity including a second RJ-45 plug;

wherein the casing includes a surface for receiving the second RJ-45 modular plug when the second portion of the LAN cable is fully retracted; and the second RJ-45 modular plug includes a shock absorber for engaging said casing surface.

26. The cable dispensing device of claim 25, wherein the shock absorber comprises a resilient pad.

27. The cable dispensing device of claim 25, wherein:
the casing includes a top surface; and
a handle projects from the top surface to facilitate lifting of the dispensing device.

* * * * *